United States Patent
Hasegawa

(10) Patent No.: US 11,891,149 B2
(45) Date of Patent: Feb. 6, 2024

(54) MOVING VEHICLE

(71) Applicant: TOYOTA JIDOSHA KABUSHIKI KAISHA, Toyota (JP)

(72) Inventor: Koji Hasegawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 603 days.

(21) Appl. No.: 17/113,562

(22) Filed: Dec. 7, 2020

(65) Prior Publication Data

US 2021/0197917 A1   Jul. 1, 2021

(30) Foreign Application Priority Data

Dec. 27, 2019   (JP) .................................. 2019-237774

(51) Int. Cl.
  *B62K 11/00*   (2006.01)
  *A47C 7/00*   (2006.01)

(52) U.S. Cl.
  CPC ............ *B62K 11/007* (2016.11); *A47C 7/006* (2013.01)

(58) Field of Classification Search
  CPC ......... B62K 11/007; A47C 7/006; A47C 9/02; A47C 3/18; A47C 3/24; A47C 9/027; B62D 61/10; B60K 1/00
  See application file for complete search history.

(56) References Cited

U.S. PATENT DOCUMENTS

| | | | | |
|---|---|---|---|---|
| 4,125,169 A | * | 11/1978 | Harris | A61G 5/048 180/65.265 |
| 5,222,567 A | * | 6/1993 | Broadhead | B60K 1/00 180/907 |
| 5,651,422 A | * | 7/1997 | Casali | B62B 5/0026 180/907 |
| 5,746,282 A | | 5/1998 | Fujiwara et al. | |
| 10,189,541 B2 | * | 1/2019 | Kinpara | B62M 6/60 |
| 10,513,196 B2 | * | 12/2019 | Liu | B60W 10/08 |

(Continued)

FOREIGN PATENT DOCUMENTS

| | | |
|---|---|---|
| CN | 107969837 A | 5/2018 |
| EP | 3 216 679 A1 | 9/2017 |

(Continued)

OTHER PUBLICATIONS

Tajima et al. A New Type of Foldable and Omnidirectional Mobile Assistive Robot, Aug. 2019, Proceedings of The 2019 IEEE International Conference on Real-time Computing and Robotics (Year: 2019).*

*Primary Examiner* — Thomas Ingram
(74) *Attorney, Agent, or Firm* — Sughrue Mion, PLLC

(57) ABSTRACT

A moving vehicle according to the present disclosure includes a chair frame including universal casters, a sitting seat disposed above the chair frame and connected to the chair frame, and a driving unit disposed below the sitting seat and connected to the chair frame so that the driving unit can rotate about a unit connection shaft, in which the driving unit includes a driving wheel including a rotation shaft located at a position deviated from a central axis of the unit connection shaft, a velocity detection unit configured to detect a rotational velocity of the driving wheel, and a driving control unit configured to control a velocity of the driving wheel according to an external driving force applied to the driving wheel.

6 Claims, 10 Drawing Sheets

(56) References Cited

U.S. PATENT DOCUMENTS

| | | | |
|---|---|---|---|
| 2009/0299525 A1* | 12/2009 | Takahashi | B60B 19/003 901/1 |
| 2011/0168464 A1* | 7/2011 | Scheuerman | B60L 50/60 180/65.51 |
| 2017/0151999 A1* | 6/2017 | Kinpara | B62K 21/26 |
| 2018/0170212 A1* | 6/2018 | Liu | B60W 10/08 |

FOREIGN PATENT DOCUMENTS

| | | |
|---|---|---|
| JP | 8-282498 A | 10/1996 |
| JP | 11-506971 A | 6/1999 |
| JP | 2011-068160 A | 4/2011 |
| JP | 2015-11384 A | 1/2015 |
| JP | 2017-159700 A | 9/2017 |
| WO | 97/37626 A1 | 10/1997 |
| WO | 2019/065310 A1 | 4/2019 |

* cited by examiner

MOVING VEHICLE

CROSS REFERENCE TO RELATED APPLICATIONS

This application is based upon and claims the benefit of priority from Japanese patent application No. 2019-237774, filed on Dec. 27, 2019, the disclosure of which is incorporated herein in its entirety by reference.

BACKGROUND

The present disclosure relates to a moving vehicle and, in particular, to a moving vehicle by which a rider (e.g., a user or an operator) can move while remaining in a sitting position.

In a workplace such as a factory, a worker repeatedly does work and moves while sitting on a chair equipped with universal casters. Further, regarding such a working chair, there is a type of working chair which is provided with power means (e.g., an engine or a motor) and the velocity and the traveling direction of which are controlled according to an instruction from an operator sitting on the working chair. Japanese Unexamined Patent Application Publication No. 2017-159700 discloses a technique related to such a movable working chair.

A moving vehicle disclosed in Japanese Unexamined Patent Application Publication No. 2017-159700 includes: a body frame; steering wheels disposed at a front part and a rear part, respectively, of the body frame; a seat disposed at an upper part of the body frame between the steering wheels at the front and rear parts; and two steps disposed on one side of the body frame, the two steps being configured so that a rider can place his/her left and right feet, respectively, thereon, in which one of the two steps is configured so that the rider can operate the steering wheels through that step.

SUMMARY

However, there are the following problems in the moving vehicle disclosed in Japanese Unexamined Patent Application Publication No. 2017-159700. That is, since the rider operates the front and rear steering wheels by using the front step, he/she needs to master the operation. Further, it is difficult to move the moving vehicle in all directions, so that it is difficult for the rider to move the moving vehicle freely and intuitively.

The present disclosure has been made in order to solve the above-described problems, and an object thereof is to achieve both an intuitive operation and an improvement in the degree of flexibility of movements in a moving vehicle which a rider uses in a sitting position.

A first exemplary aspect is a moving vehicle including: a chair frame including universal casters; a sitting seat disposed above the chair frame and connected to the chair frame; and a driving unit disposed below the sitting seat and connected to the chair frame so that the driving unit can rotate about a unit connection shaft, in which the driving unit includes: a driving wheel including a rotation shaft located at a position deviated from a central axis of the unit connection shaft; a velocity detection unit configured to detect a rotational velocity of the driving wheel; and a driving control unit configured to control a velocity of the driving wheel according to an external driving force applied to the driving wheel.

In the moving vehicle according to the present disclosure, since the driving wheel is disposed so as to be offset from (i.e., deviated from) the central axis of the unit connection shaft, which is the rotational center of the driving unit, the driving unit rotates so that its direction follows a direction in which the rider sitting on the sitting seat kicks the ground. Further, the driving control unit controls power to the driving wheel according to a driving force (an external driving force) that is applied to the driving wheel as the rider kicks the floor surface.

According to the present disclosure, it is possible to provide a moving vehicle by which a rider can easily move in a desired direction while sitting on a sitting seat without operating the moving vehicle with his/her hand.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
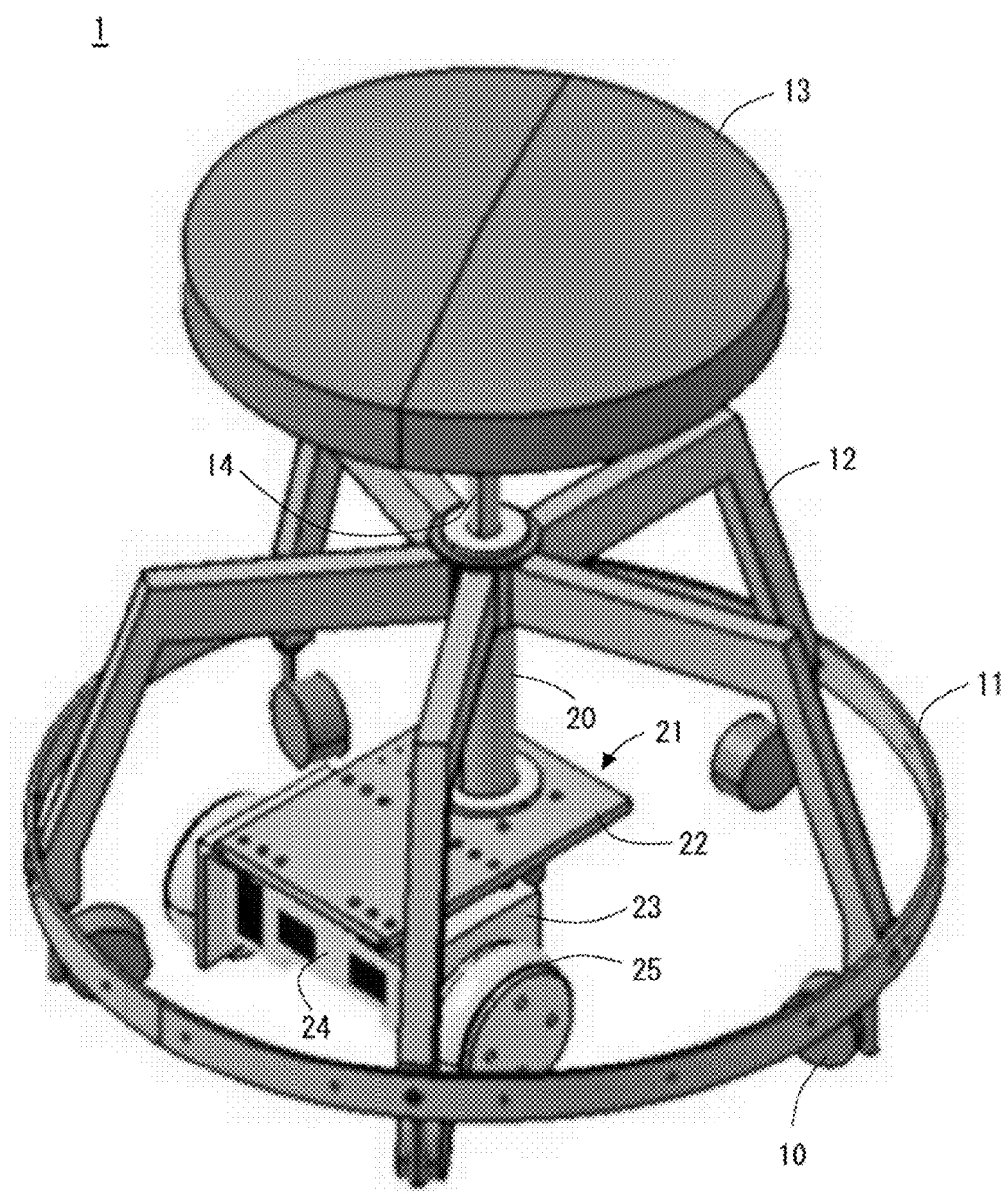
FIG. 1 is a schematic diagram of an external appearance of a moving vehicle according to a first embodiment.

Firstly, FIG. 1 is a schematic diagram of an external appearance of a moving vehicle 1 according to a first embodiment. As shown in FIG. 1, the moving vehicle 1 according to the first embodiment includes universal casters 10, a step 11, a chair frame 12, a sitting seat 13, a frame shaft 14, a unit connection shaft 20, and a driving unit 21.

In the moving vehicle 1, the frame shaft 14 is disposed below the sitting seat 13 and is connected to the sitting seat 13. The chair frame 12 includes a plurality of legs (five legs in the example shown in FIG. 1). The plurality of legs are connected to each other at one end thereof through a cylinder into which the frame shaft 14 is inserted. Further, each of the universal casters 10 is connected to a respective one of the plurality of legs at the other end thereof, i.e., at the end on the ground side. Further, the step 11 is connected to the plurality of legs in such a manner that it surrounds the ground-side ends of these legs. Further, in the moving vehicle 1, the chair frame 12 is connected to the frame shaft 14, which is connected to the sitting seat 13, so that the frame shaft 14 can endlessly rotate with respect to the chair frame 12.

Further, in the moving vehicle 1, the driving unit 21 is disposed below the sitting seat 13 and connected to the chair frame 12 so that the driving unit 21 can rotate about the unit connection shaft 20. Further, the driving unit 21 is connected to the chair frame 12 so that the driving unit 21 can endlessly rotate with respect to the unit connection shaft 20. In the moving vehicle 1 according to the first embodiment shown in FIG. 1, the unit connection shaft 20 is connected to the chair frame 12 at a position at which the central axis of the unit connection shaft 20 coincides with that of the frame shaft 14, i.e., below the central part of the sitting seat 13. Note that the center axis of the frame shaft 14 and that of the unit connection shaft 20 do not necessarily have to coincide with each other.

Further, the driving unit 21 includes a driving-unit bracket 22, a motor bracket 23, motors 24, and driving wheels 25. As shown in FIG. 1, the driving unit 21 is connected to the unit connection shaft 20 at a position offset from (i.e., deviated from) the center of the driving-unit bracket 22. Further, the motor bracket 23 is connected to the driving-unit bracket 22 at a position different from the position where the unit connection shaft 20 is connected to the driving-unit bracket 22. Further, the motors 24 and the driving wheels 25 are connected to the motor bracket 23. By the above-described configuration, in the driving unit 21, the rotation shaft of the driving wheels 25 is located at a position offset from (i.e., deviated from) the central axis of the unit connection shaft 20. Note that other components (which will be described later) are also attached to the driving unit 21.

Figure 2:
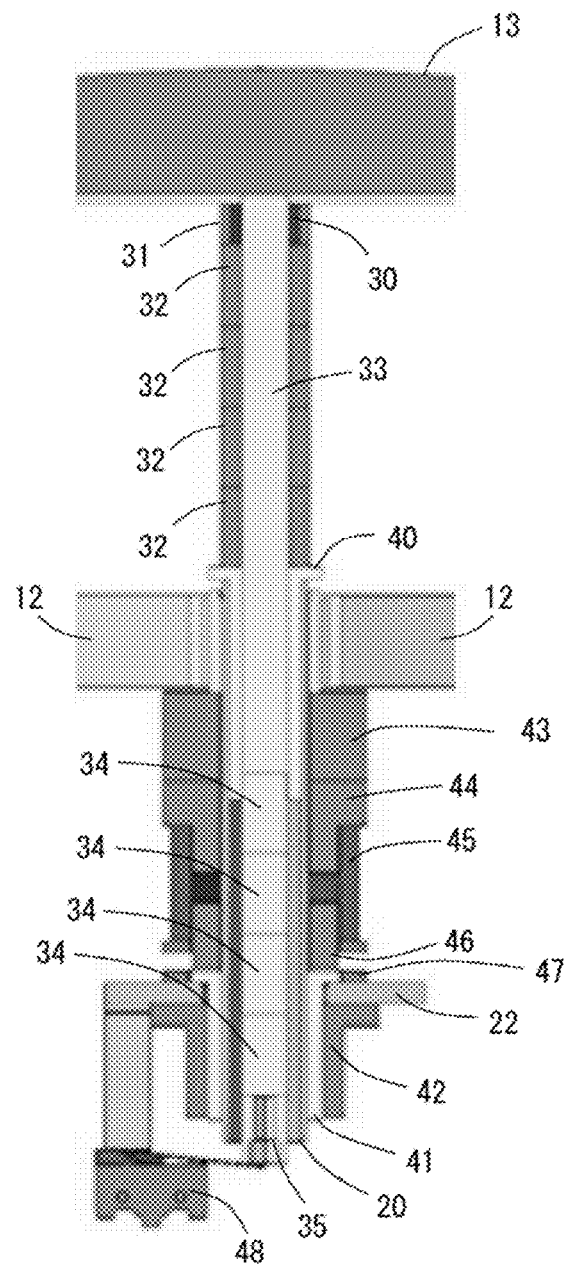
FIG. 2 is a cross-cross-sectional view for explaining a configuration of a frame shaft and a unit connection shaft of the moving vehicle according to the first embodiment.

Next, a configuration of the frame shaft 14 and the unit connection shaft 20 will be described in detail. FIG. 2 is a cross-sectional view for explaining the configuration of the frame shaft 14 and the unit connection shaft 20 of the moving vehicle 1 according to the first embodiment.

As shown in FIG. 2, the frame shaft 14 includes a seat rod spring 30, a stroke stopper 31, seat spacers 32, a seat rod 33, seat rod extensions 34, and a switch pusher 35. The seat rod 33 is connected to the underside of the sitting seat 13. Further, the seat spacers 32, the seat rod spring 30, and the stroke stopper 31 are disposed so that the seat rod 33 passes therethrough. The seat rod spring 30 is disposed between the seat spacers 32 and the sitting seat 13. Further, the seat rod spring 30 contracts (i.e., shortens) when a rider sits on the sitting seat 13 and expands when the rider leaves (e.g., stands up from) the sitting seat 13. The stroke stopper 31 supports the sitting seat 13 when the seat rod spring 30 has contracted (i.e., shortened). The seat spacers 32 are interposed between the sitting seat 13 and the chair frame 12 in order to adjust the distance between the chair frame 12 and the sitting seat 13. Although there are four seat spacers 32 in the example shown in FIG. 2, the number of seat spacers 32 can be changed as appropriate according to the height of the seat desired by the rider.

The switch pusher 35 is disposed at an end of the seat rod 33 opposite to the end thereof connected to the sitting seat 13. The switch pusher 35 pushes down a limit switch 48 when a rider sits on the sitting seat 13. Further, the seat rod extensions 34 are interposed between the seat rod 33 and the switch pusher 35. The seat rod extensions 34 are used to lower the position of the switch pusher 35, which is raised toward the sitting seat 13 because of the interposed seat spacers 32, to its original position. Therefore, the same number of seat rod extensions 34 as the number of seat spacers 32 are used.

As shown in FIG. 2, the chair frame 12 is connected to the seat rod 33 with a seat rod bushing 40 interposed therebetween. The seat rod bushing 40 is disposed in order to enable the seat rod 33 to smoothly move in the vertical direction and smoothly rotate while suppressing wobbliness between the chair frame 12 and the seat rod 33.

As shown in FIG. 2, the unit connection shaft 20 includes a center bushing 41, a center bushing holder 42, a spacer 43, spring retainers 44 and 46, a traction spring 45, and a thrust bearing 47.

The center bushing 41 is disposed between the unit connection shaft 20 and the driving-unit bracket 22. The center bushing 41 is disposed in order to enable the unit connection shaft 20 to smoothly move in the vertical direction and smoothly rotate while suppressing wobbliness between the driving-unit bracket 22 and the unit connection shaft 20. The spacer 43 is disposed to adjust the traction. In particular, the traction is changed by changing the height of the spacer 43. The spring retainers 44 and 46 vertically sandwich the traction spring 45 and thereby support the traction spring 45. The traction spring 45 presses the driving unit 21 toward the ground surface (e.g., the floor surface) and thereby presses the driving wheels 25 toward the ground surface. The thrust bearing 47 is provided in order to enable the driving unit 21 to smoothly rotate about the unit connection shaft 20.

Further, as shown in FIG. 2, the limit switch 48 is disposed in the driving-unit bracket 22. This limit switch 48 outputs a signal indicating an ON-state when a rider sits on the sitting seat 13 and the switch pusher 35, which sinks because of the sitting of the rider, brings a contact into a contacted state. Further, the limit switch 48 outputs a signal indicating an OFF-state when the rider leaves (e.g., stands up from) the sitting seat 13 and the switch pusher 35, which is raised because of the leaving of the rider, releases the contact from the contacted state. In the moving vehicle 1 according to the first embodiment, power can be supplied to the driving wheels 25 only when the limit switch 48 is outputting a signal indicating an ON-state. This mechanism related to the limit switch 48 is also called a dead-man switch mechanism.

Figure 3:
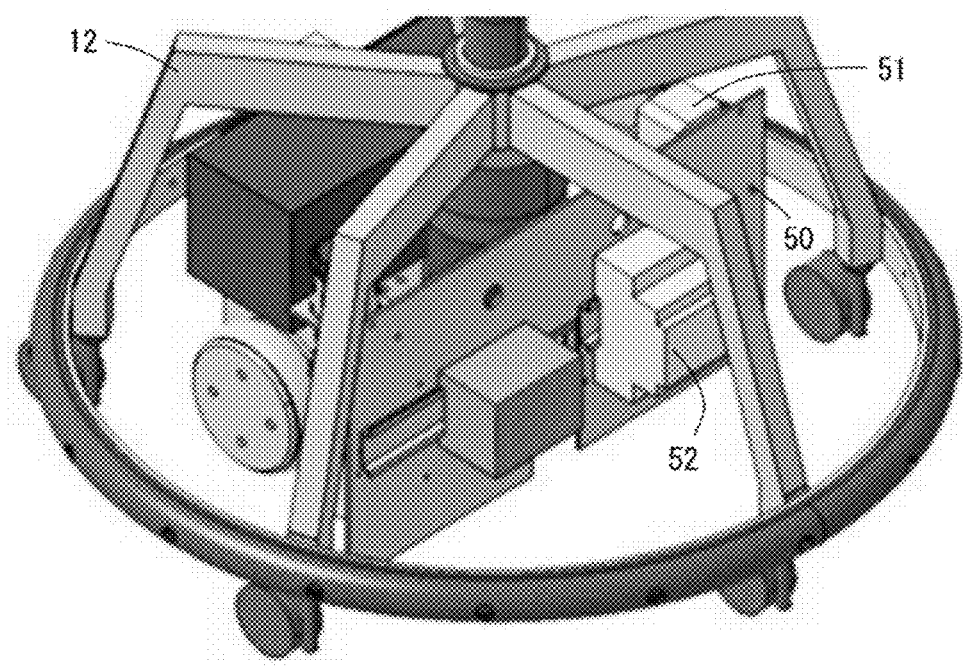
FIG. 3 is a schematic diagram for explaining a configuration of a driving unit of the moving vehicle according to the first embodiment.
Figure 4:
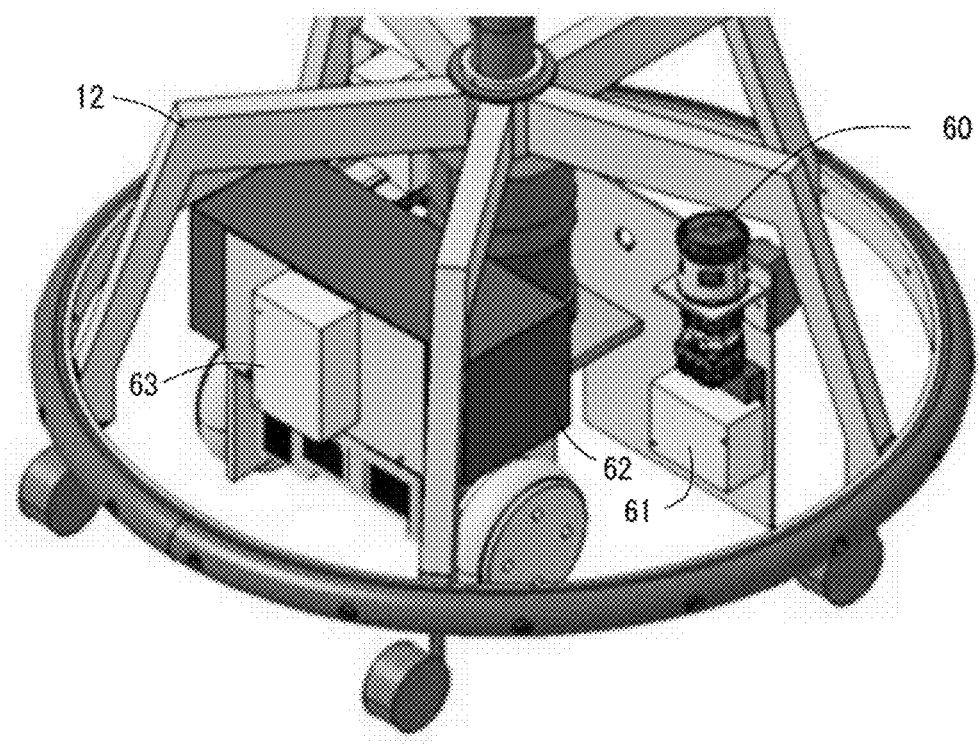
FIG. 4 is a schematic diagram for explaining a configuration of the driving unit of the moving vehicle according to the first embodiment.

Next, other components/structures of the driving unit 21 that are connected to the driving-unit bracket 22 will be described. FIG. 3 and FIG. 4 are schematic diagrams for explaining a configuration of the driving unit of the moving vehicle according to the first embodiment. The schematic diagram shown in FIG. 3 is one in which the driving unit 21 is viewed from a side on which an electrical-component base 50 connected to the driving-unit bracket 22 is located. As shown in FIG. 3, a power-supply switch 51 and a driving control unit 52 are provided in the electrical-component base 50. Note that the driving control unit 52 is implemented by using an MCU (Micro Controller Unit) or the like.

The power-supply switch 51 is a switch for switching as to whether or not to operate the driving unit 21. The driving control unit 52 performs control as to what kind of power is given to the driving wheels 25 in the driving unit 21.

The schematic diagram shown in FIG. 4 is one in which the driving unit 21 is viewed from a side on which a battery 62 connected to the driving-unit bracket 22 is located. As shown in FIG. 4, an emergency stop button 60 and motor drivers 61 are provided in the electrical-component base 50 in addition to the components/structures described above with reference to FIG. 3. The emergency stop button 60 is pushed down when a rider or the like of the moving vehicle 1 needs to urgently stop the moving vehicle 1. The moving vehicle 1 stops its operation when the emergency stop button 60 is pushed down.

The motor drivers 61 are circuits for driving the motors 24, and operate (i.e., drive) the motors 24 according to an instruction from the driving control unit 52. The battery 62 is a power source for the driving unit 21. A DC-DC converter 63 converts an output voltage of the battery 62 into a voltage of electric power for operating the driving control unit 52 or a voltage of electric power for operating the motor drivers 61.

Figure 5:
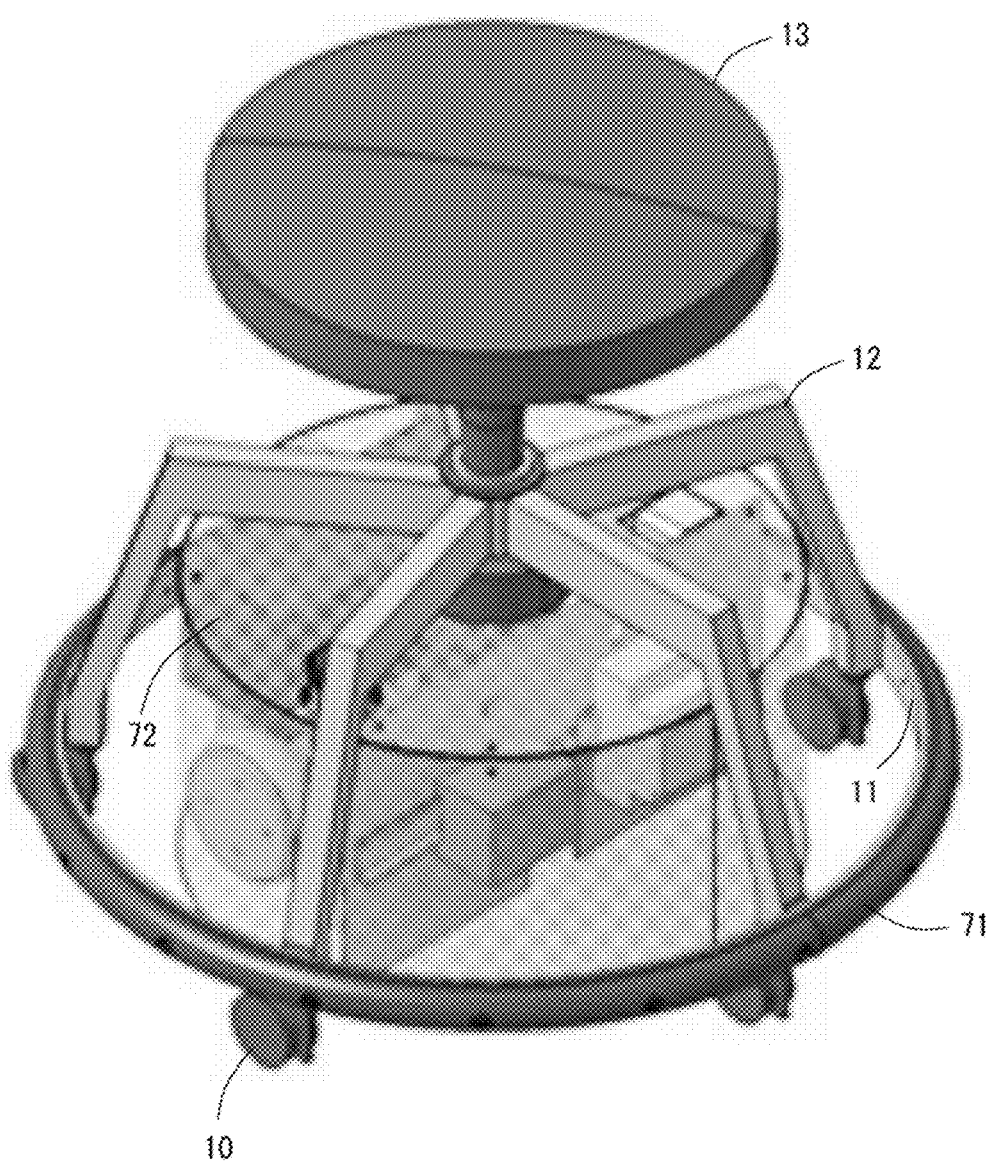
FIG. 5 is a schematic diagram for explaining an external appearance of the moving vehicle according to the first embodiment in which a cover for the driving unit is attached thereto.

Next, a safety cover of the moving vehicle 1 according to the first embodiment will be described. FIG. 5 is a schematic diagram for explaining an external appearance of the moving vehicle according to the first embodiment in which a cover for the driving unit is attached thereto. As shown in FIG. 5, a safety cover 72 is provided so as to extend over a range in which the safety cover 72 does not interfere with the movement of the driving unit 21. By providing the safety cover 72, it is possible to prevent a failure of the driving unit 21 such as damage to the driving unit 21 which would otherwise be caused when a part of the body of the rider collides with the driving unit 21, or when an object collides with the driving unit 21. Further, by providing a bumper 71 along the outer periphery of the step 11, it is possible to reduce an impact against the moving vehicle 1 that is caused when the moving vehicle 1 collides with other objects.

Figure 6:
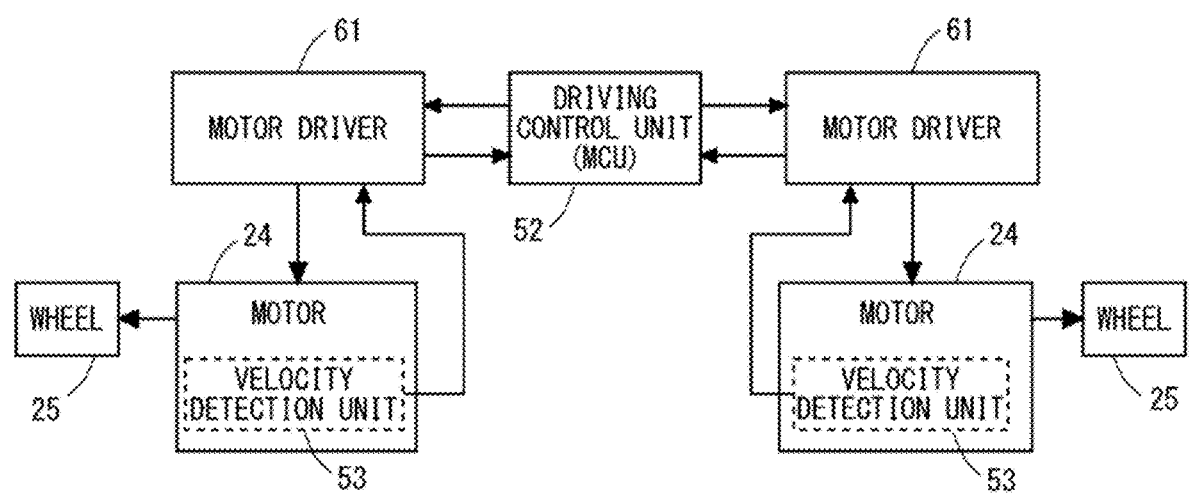
FIG. 6 is a block diagram for explaining a configuration of the driving unit of the moving vehicle according to the first embodiment.

Next, a control system provided in the driving unit 21 of the moving vehicle 1 according to the first embodiment will be described. FIG. 6 is a block diagram for explaining a configuration of the driving unit 21 of the moving vehicle 1 according to the first embodiment.

As shown in FIG. 6, the driving unit 21 includes the motors 24, the driving wheels 25, the driving control unit 52, and the motor drivers 61. Further, the driving control unit 52 is, for example, a semiconductor device such as an MCU in which an arithmetic unit capable of executing a program and peripheral circuits such as an analog-to-digital conversion circuit, a digital-to-analog conversion circuit, a coprocessor, and a memory are integrated into one system. Further, in the moving vehicle 1, output signals of components that detect the rotation angles of the motors 24 in the motors 24 are used to detect the velocity of the moving vehicle 1. Therefore, an example in which the moving vehicle 1 includes velocity detection units 53 in the motors 24 is shown. Note that the velocity detection units 53 may be provided separately from the motors 24.

The driving control unit 52 controls the velocities of the driving wheels 25 according to an external driving force applied to the driving wheels 25. Further, the velocity detection units 53 detect the rotational velocities of the driving wheels 25 and transmit information about the rotational velocities of the driving wheels 25 to the driving control unit 52 through the motor drivers 61.

Specifically, the driving control unit 52 supplies no power to the driving wheels 25 in a period during which the velocity of the moving vehicle 1 calculated from the rotational velocities of the driving wheels 25 is equal to or lower than a first velocity. Further, the driving control unit 52 supplies power for moving the moving vehicle 1 at the first velocity to the driving wheels 25 when the velocity of the moving vehicle 1 becomes a velocity that is higher than the first velocity and is equal to or lower than a second velocity higher than the first velocity. Further, the driving control unit 52 supplies power for moving the moving vehicle 1 at a third velocity higher than the second velocity to the driving wheels 25 when the velocity of the moving vehicle 1 becomes higher than the second velocity. Further, the driving control unit 52 stops supplying power to the driving wheels 25 when a time during which a torque larger than a predefined limit torque is applied to the driving wheels 25 by an external driving force continues for a predefined limit time or longer.

In the driving unit 21, when the above-described driving control unit 52 performs control, the driving control unit 52 outputs a velocity command value(s) to the motor drivers 61 and the motor drivers 61 drive the motors 24 based on the received velocity command value, so that the driving wheels 25 rotate at a velocity(ties) corresponding to the velocity command value. Further, the velocity detection units 53 detect the rotational velocities of the motors 24 and transmit them to the driving control unit 52.

Further, in the driving unit 21, it is possible to supply power corresponding to an external driving force to the driving wheels 25 only in a period during which the power-supply switch 51 is in an ON-state and a signal indicating that the limit switch 48 is in an ON-state is being provided to the driving control unit 52.

Figure 7:
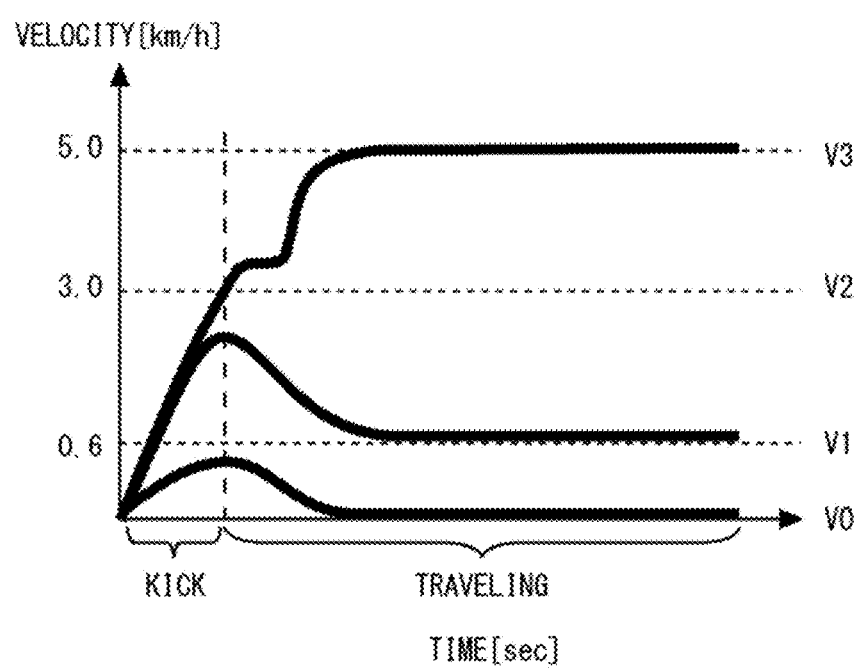
FIG. 7 is a graph for explaining operating characteristics of the driving unit of the moving vehicle according to the first embodiment.

Operating characteristics of the driving control unit 52 will be described hereinafter. FIG. 7 is a graph for explaining operating characteristics of the driving unit of the moving vehicle according to the first embodiment. As shown in FIG. 7, in the driving unit 21, as a rider kicks the floor surface, an external driving force is applied to the driving wheels 25. When the velocity of the moving vehicle 1 does not reach a first velocity V1 by the floor-surface kicking action, the driving control unit 52 shuts off the power to the driving wheels 25 and thereby prevents the driving wheels 25 from rotating by themselves. Further, when the moving vehicle 1 has a velocity that is higher than the first velocity V1 and lower than a second velocity V2 higher than the first velocity V1 by the kicking action, the driving control unit 52 operates so as to maintain the velocity of the moving vehicle 1 at the first velocity V1 by supplying power to the driving wheels 25. Further, when the moving vehicle 1 has a velocity higher than the second velocity V2 by the kicking action, the driving control unit 52 operates so as to maintain the velocity of the moving vehicle 1 at a third velocity V3 higher than the second velocity V2 by supplying power to the driving wheels 25. Further, the driving control unit 52 shuts off the power supplied to the driving wheels 25 when a torque that results from the external driving force and is equal to or higher than a limit torque is applied to the driving wheels 25 for a predetermined period or longer.

Figure 8:
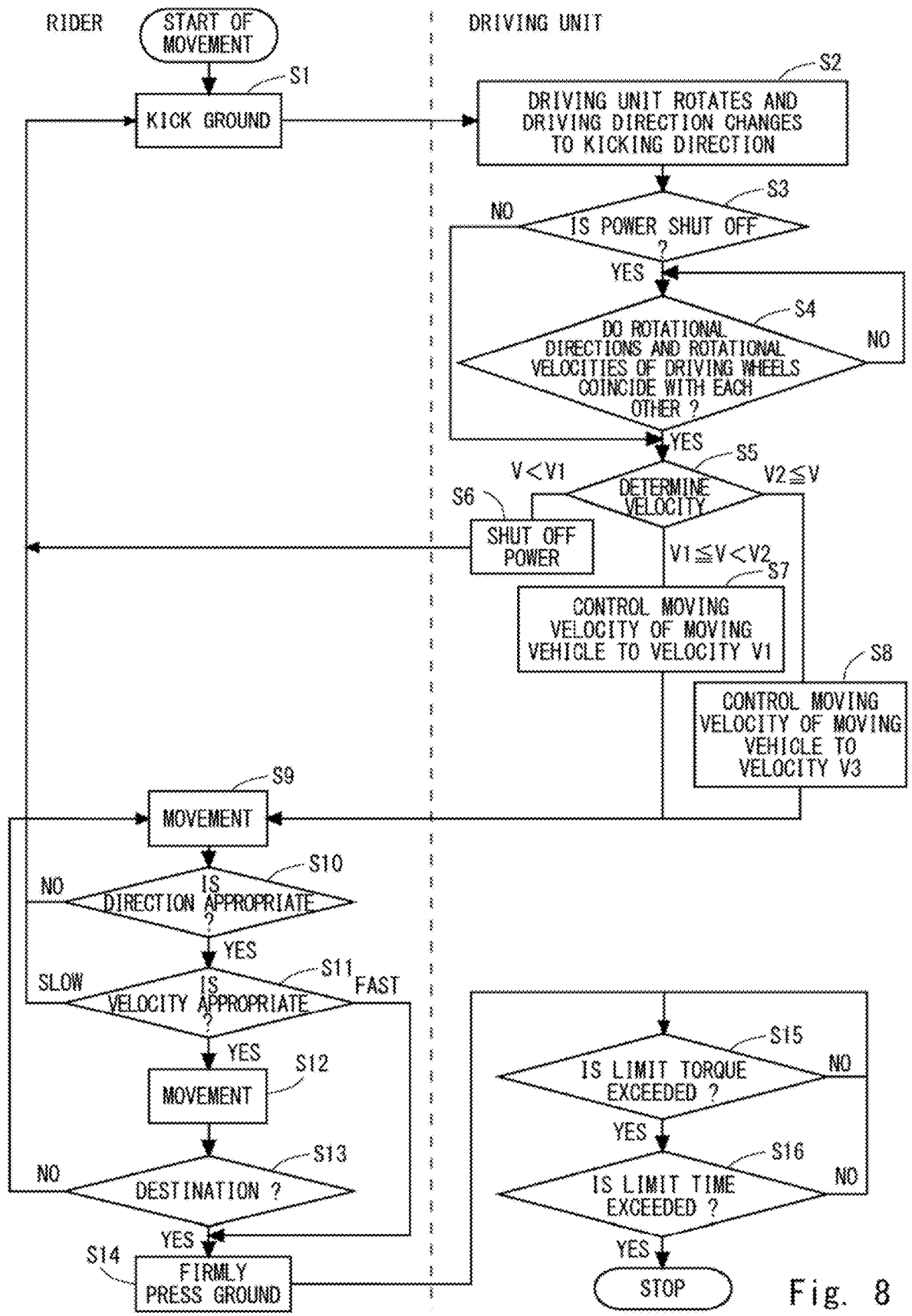
FIG. 8 is a flowchart for explaining operations performed by the moving vehicle according to the first embodiment.

Next, operations performed by the moving vehicle 1 according to the first embodiment will be described in detail. FIG. 8 is a flowchart for explaining operations performed by the moving vehicle according to the first embodiment. As shown in FIG. 8, the moving vehicle 1 moves as the driving unit 21 controls the rotational velocities of the driving wheels 25 according to an external driving force applied by a rider.

As shown in FIG. 8, when the rider kicks the ground (step S1), the driving unit 21 rotates so that its direction follows the kicking direction (step S2). At this point, the driving unit 21 determines whether or not power is currently supplied to the driving wheels 25 (step S3). When the driving control unit 52 determines that the power to the driving wheels 25 is in an OFF-state (e.g., a shut-off state) in the determination in the step S3, the driving control unit 52 determines whether or not the rotational directions and the rotational velocities of the two driving wheels 25 coincide with each other (step S4). When the driving control unit 52 determines that the rotational directions and the rotational velocities of the two driving wheels 25 coincide with each other in the step S4, the driving control unit 52 determines whether or not the moving velocity V of the moving vehicle 1 calculated from the rotational velocities of the driving wheels 25 is higher than the first velocity V1 or the second velocity V2 (step S5). Then, when the driving control unit 52 determines that the moving velocity V of the moving vehicle 1 is lower than the first velocity V1 in the step S5, the driving control unit 52 shuts off the power to the driving wheels 25 (step S6). Then, the moving vehicle 1 waits for the next velocity input (e.g., the step S1). Further, when the driving control unit 52 determines that the moving velocity V of the moving vehicle 1 is equal to or higher than the first velocity V1 and lower than the second velocity V2 in the step S5, the driving control unit 52 controls the rotational velocities of the driving wheels 25 so that the velocity of the moving vehicle 1 becomes the first velocity V1 (step S7). Further, when the driving control unit 52 determines that the moving velocity V of the moving vehicle 1 is equal to or higher than the second velocity V2 in the step S5, the driving control unit 52 controls the rotational velocities of the driving wheels 25 so that the velocity of the moving vehicle 1 becomes the third velocity V3 (step S8).

On the other hand, when the driving control unit 52 determines that power is being supplied to the driving wheels 25 in the determination process in the step S3, the driving control unit 52 determines the velocity in the step S5. Further, when the driving control unit 52 determines that the rotational directions and the rotational velocities of the two driving wheels 25 do not coincide with each other in the determination process in the step S4, the driving control unit 52 waits until the rotational directions and rotational velocities of the two driving wheels 25 coincide with each other.

When the control for the driving wheels 25 is performed in the step S7 or the step S8, the rider determines whether the moving vehicle 1 is moving in the intended traveling direction at the intended traveling velocity (steps S9, S10 and S11). Then, when the rider determines that the moving vehicle 1 is not moving in the intended traveling direction or the velocity of the moving vehicle 1 is lower, the rider kicks the ground again (step S1). Further, when the rider determines that the velocity of the moving vehicle 1 is higher, the rider makes an effort such as pressing the ground with his/her feet in the direction opposite to the traveling direction and thereby applies an external driving force to the driving wheels 25 (step S14). Further, the rider lets the moving vehicle 1 move in the intended traveling direction at the intended traveling velocity (step S12), and repeats the operations in the steps S9 to S12 until the moving vehicle 1 arrives at the destination (step S13). Then, when the moving vehicle 1 arrives at the destination, the rider makes an effort such as pressing the ground with his/her feet in the direction opposite to the traveling direction and thereby applies an external driving force to the driving wheels 25 (step S14).

Then, in response to the fact that the torque that is applied to the driving wheels 25 by the external driving force generated by the rider's action such as pressing the ground with his/her feet in the direction opposite to the traveling direction in the step S14 is larger than the predefined limit torque and the length of the time during which the torque equal to or larger than the limit torque is being applied to the driving wheels 25 exceeds a predefined limit time, the driving control unit 52 shuts off the supply of power to the driving wheels 25 and thereby brings the moving vehicle 1 into a stopped state (steps S15 and S16).

As described above, the moving vehicle 1 according to the first embodiment calculates the velocity of the moving vehicle 1 at the time when the driving wheels 25 are rotated by a kicking action performed by the rider from the rotational velocities of the driving wheels 25. Then, when the moving velocity of the moving vehicle 1 exceeds a predefined velocity, the moving vehicle 1 supplies power to the driving wheels 25 according to the exceeding velocity after the kicking action. In this way, in the moving vehicle 1 according to the first embodiment, the rider can make the moving vehicle 1 move itself by its own power at a predetermined velocity without repeating the kicking action. Further, in the moving vehicle 1 according to the first embodiment, the rider can stop the moving vehicle 1 by making an effort such as pressing the ground with his/her feet in the direction opposite to the traveling direction and thereby applying an external driving force for stopping the driving wheels 25 to the driving wheels 25.

Further, in the moving vehicle 1 according to the first embodiment, as the rider kicks the floor surface, the driving unit 21 rotates so that the traveling direction of the driving wheels 25 changes so as to follow the kicking direction. In this way, in the moving vehicle 1 according to the first embodiment, the rider can change the direction of the moving vehicle 1 to all the directions (i.e., to any direction) by performing a kicking action.

Since the above-described operations performed by the moving vehicle 1 according to the first embodiment can be performed (i.e., triggered) just by a kicking action performed by the rider, the rider of the moving vehicle 1 does not need to continue (i.e., repeat) the kicking action for moving the moving vehicle 1 while being able to change the direction of the moving vehicle 1 and adjust the velocity thereof without using his/her hands. Further, in the operations performed by the moving vehicle 1 according to the first embodiment, the rider does not need to pay any attention to the direction of the driving wheels 25 and to the direction of the chair frame 12, and can intuitively operate the moving vehicle 1. As a result, it is possible to alleviate the fatigue of the user of the moving vehicle 1 according to the first embodiment. Further, since no complicated mechanism such as an operating device is used, it is possible to prevent the moving vehicle 1 from going out of control due to a mistake in user's operation or the like.

Further, in the moving vehicle 1 according to the first embodiment, the driving unit 21 is rotated by the mechanical structure and does not require electrical control. Therefore, there is no need to provide sensors and control circuits using such sensors, thus making it possible to reduce the number of necessary components.

Second Embodiment

In a second embodiment, a moving vehicle 2, which is a modified example of the moving vehicle 1 according to the first embodiment, will be described. Note that in the following description of the second embodiment, the same reference numerals as those of the first embodiment are assigned to the same components as those of the first embodiment, and their descriptions are omitted.

Figure 9:
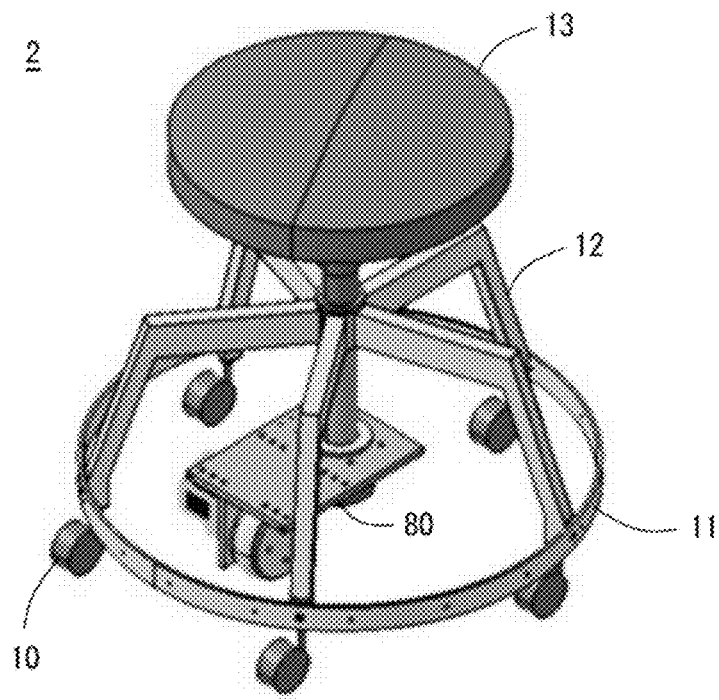
FIG. 9 is a schematic diagram of an external appearance of a moving vehicle according to a second embodiment.
Figure 9:
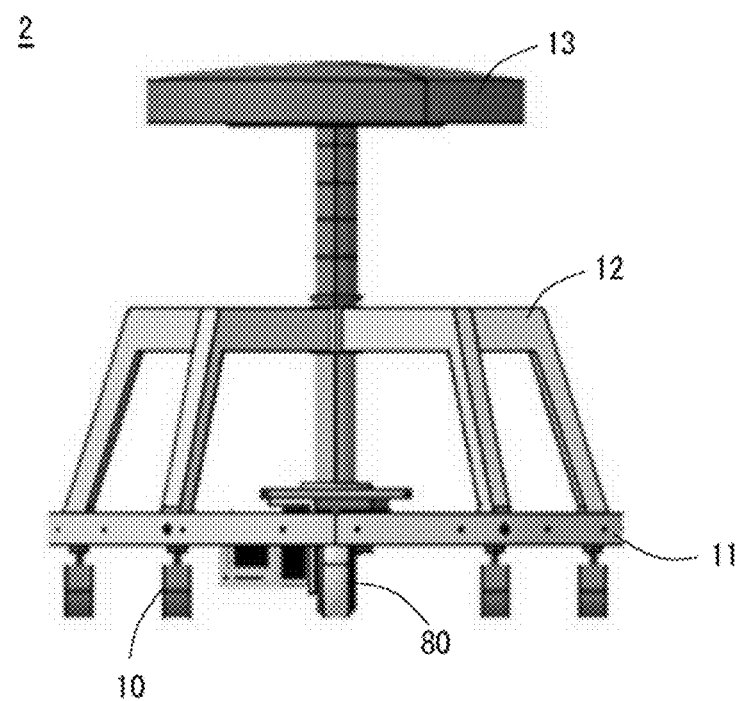

FIG. 9 is a schematic diagram of an external appearance of the moving vehicle 2 according to the second embodiment. The upper part of FIG. 9 is a perspective view of the moving vehicle 2, and the lower part thereof is a side view showing a driving unit 80 having a single driving wheel structure. As shown in FIG. 9, the moving vehicle 2 according to the second embodiment includes the driving unit 80 including one driving wheel. In the configuration of the driving unit 80, the single wheel structure is formed by a motor driver 61, a motor 24, and a driving wheel 25. Regarding the driving control unit 52 of the driving unit 80, the fundamental control for the moving vehicle is the same as that performed by the driving control unit 52 according to the first embodiment shown in FIG. 8, except that, among the operations performed by the driving control unit 52 according to the first embodiment, the determination as to the coincidence of the rotational directions and the rotational velocities of the right and left wheels performed in the step S4 in FIG. 8 is not performed.

As described above, even when the single driving wheel structure is adopted, it is possible to move the moving vehicle 2 without giving a feeling of wrongness by, for example, appropriately combining the material of the floor surface with that of the driving wheel. Further, in the moving vehicle 2 according to the second embodiment, as compared to the moving vehicle 1 according to the first embodiment, the number of motor drivers 61 and motors 24, which may cause a failure more often than other components, can be reduced. Therefore, its reliability is further improved.

Third Embodiment

In a third embodiment, a moving vehicle 3, which is a modified example of the moving vehicle 1 according to the first embodiment, will be described. Note that in the following description of the third embodiment, the same reference numerals as those of the first embodiment are assigned to the same components as those of the first embodiment, and their descriptions are omitted.

Figure 10:
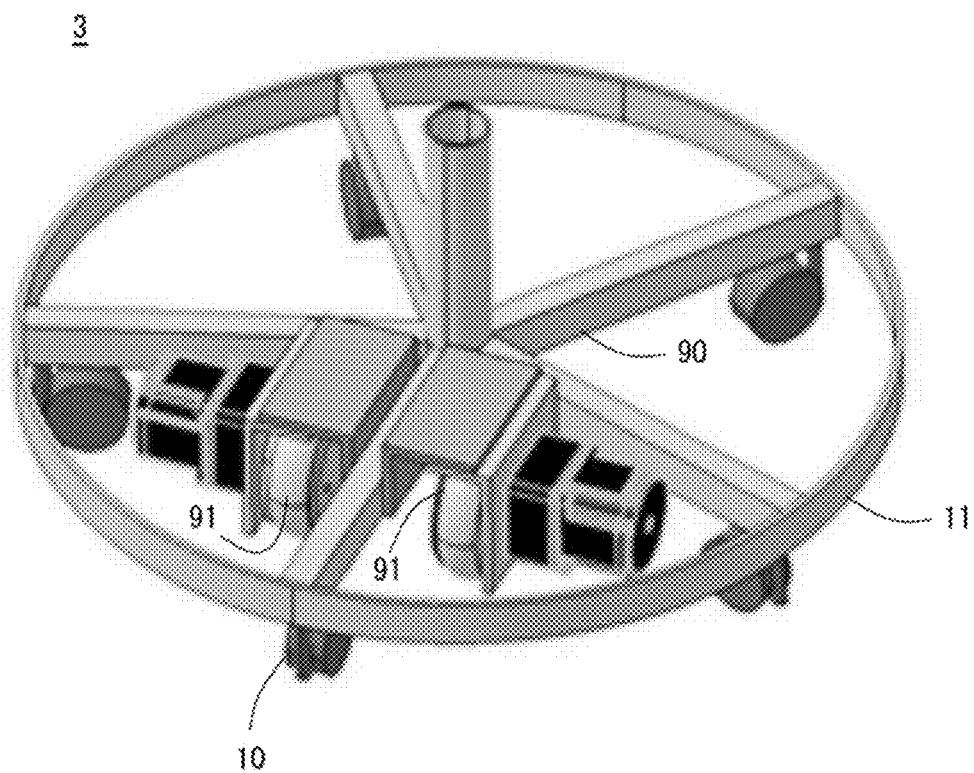
FIG. 10 is a schematic diagram of an external appearance of a moving vehicle according to a third embodiment.

FIG. 10 is a schematic diagram of an external appearance of the moving vehicle 3 according to the third embodiment. Although the sitting seat 13 and the frame shaft 14 are not shown in FIG. 10, the frame shaft 14 is also inserted into a cylinder disposed at the central part of the chair frame 90 in the moving vehicle 3.

As shown in FIG. 10, in the moving vehicle 3 according to the third embodiment, a driving unit 91 is directly connected to the chair frame 90. Further, the cylinder which is connected to the chair frame 90 and into which the frame shaft 14 is inserted serves as the unit connection shaft 20.

That is, in the moving vehicle 3 according to the third embodiment, the seat shaft, which connects the chair frame 90 with the sitting seat 13, functions as the unit connection shaft 20, and the driving unit 91 is directly connected to the chair frame 90 without the unit connection shaft 20 interposed therebetween.

Even in the above-described configuration, since the driving unit 91 is rotatably connected to the sitting seat 13, the moving vehicle 3 according to the third embodiment can perform the same operations as those performed by the moving vehicle 1 according to the first embodiment.

Other Features

Even in the case where an integrated seat frame structure in which the chair frame 12 and the sitting seat 13 are fixedly connected so that they do not rotate with respect to each other is adopted, the driving unit 21 may be rotatably disposed below the sitting seat integrally formed with the seat frame.

Further, even when the chair frame 12, the sitting seat 13, and the driving unit 21 are connected so that their relative positions and orientations are fixed, a rider can perform various movements such as a turning motion and a stopping motion, though the restrictions in the moving direction, such as a difficulty in a lateral movement, increase.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A moving vehicle comprising:
a chair frame comprising universal casters;
a sitting seat disposed above the chair frame and connected to the chair frame; and
a driving unit disposed below the sitting seat and connected to the chair frame so that the driving unit can rotate about a unit connection shaft, wherein
the driving unit comprises:
a driving wheel comprising a rotation shaft located at a position deviated from a central axis of the unit connection shaft;
a velocity detection unit configured to detect a rotational velocity of the driving wheel; and
a driving control unit configured to control a velocity of the driving wheel according to an external driving force applied to the driving wheel, wherein
the driving control unit does not supply power to the driving wheel in a period during which a velocity of the moving vehicle is equal to or lower than a first velocity, and
the driving control unit supplies power for moving the moving vehicle at the first velocity to the driving wheel when the velocity of the moving vehicle becomes a velocity that is higher than the first velocity and is equal to or lower than a second velocity higher than the first velocity.

2. The moving vehicle according to claim 1, wherein the driving control unit supplies power for moving the moving vehicle at a third velocity higher than the second velocity to the driving wheel when the velocity of the moving vehicle becomes higher than the second velocity.

3. The moving vehicle according to claim 1, wherein the driving unit is connected to the chair frame with the unit connection shaft interposed therebetween.

4. The moving vehicle according to claim 1, wherein
a seat shaft functions as the unit connection shaft, the seat shaft connecting the chair frame with the sitting seat, and
the driving unit is connected to the chair frame without the unit connection shaft interposed therebetween.

5. The moving vehicle according to claim 1, wherein the unit connection shaft comprises a traction spring configured to press the driving wheel against a ground surface.

6. A moving vehicle comprising:
- a chair frame comprising universal casters;
- a sitting seat disposed above the chair frame and connected to the chair frame; and
- a driving unit disposed below the sitting seat and connected to the chair frame so that the driving unit can rotate about a unit connection shaft, wherein the driving unit comprises:
- a driving wheel comprising a rotation shaft located at a position deviated from a central axis of the unit connection shaft;
- a velocity detection unit configured to detect a rotational velocity of the driving wheel; and
- a driving control unit configured to control a velocity of the driving wheel according to an external driving force applied to the driving wheel,
- wherein the driving control unit stops supplying power to the driving wheel when a time during which a torque larger than a predefined limit torque is applied to the driving wheel by an external driving force continues for a predefined limit time or longer.

* * * * *